Oct. 2, 1934.  B. K. STUBER  1,975,758

UNIVERSAL JOINT

Filed Sept. 25, 1933  2 Sheets-Sheet 1

INVENTOR
BERNARD K. STUBER.
BY
ATTORNEYS

Oct. 2, 1934.  B. K. STUBER  1,975,758
UNIVERSAL JOINT
Filed Sept. 25, 1933   2 Sheets-Sheet 2

INVENTOR
BERNARD K. STUBER.
BY
ATTORNEYS

Patented Oct. 2, 1934

1,975,758

UNITED STATES PATENT OFFICE 1,975,758

UNIVERSAL JOINT

Bernard K. Stuber, Detroit, Mich.

Application September 25, 1933, Serial No. 690,825

16 Claims. (Cl. 64—91)

This invention relates to universal joints of the so-called constant velocity type and has for its object to provide an improved joint of simple construction which will not bind in any position which the parts may assume and which will, as a result, be of long life.

Constant velocity joints are, most generally, constructed of two main ball parts provided with corresponding grooves to receive balls through which driving is effected. The grooves are concentric with the ball members and hence the balls may be said to float, there being no restraining means against floating, or free rolling, other than the driving pressure during operation and the lubricant therearound which may congeal, more or less, during periods of idleness. As a result when such joints are idle, a slight jar may displace one or more balls from their normal position, and in case the members are co-axial such displacement very often does occur. Upon subsequent rotation the two ball members will, sooner or later, be called upon to assume an angularity with respect to each other and hence the ball grooves must also assume an angularity with respect to their corresponding grooves. In order that this may be fully understood, consider only two diametrically opposite sets of grooves constituting inner and outer ball races and having the driving balls therein. When the two members are in alined or coaxial position the two considered sets have coinciding horizontal longitudinal bi-secting planes. Now, suppose that the axes of the two joint members are given a relative angularity. The said bi-secting plane of the two grooves of the inner ball member then intersects the said plane of the grooves of the outer ball member and if the balls are out of place the ball centers do not lie on the line of intersection of the planes. The actual vertex of the intersecting angle is thus destroyed and binding and breakage results.

In an attempt to overcome this condition, a ball cage or ball retaining means has been proposed having curved surfaces to closely fit the ball members in some instances, and in others being entirely free thereof. Joints of this type are an improvement in that if the joint begins operation with the balls in normal position they may not lose their correct position, depending on the number of balls used, but there is always the possibility of displacement of the cage particularly when the joint is idle, regardless of the number of balls.

Several different suggestions have been made to use auxiliary piloting devices such as spring pressed means of various design to maintain the ball cage in correct position, but I am not aware of any of these suggestions which have proven satisfactory from a commercial standpoint both because of added cost and unreliability due to the fact that the parts are small and a slight imperfection of operation is likely to result in breakage.

It is therefore the primary object of the present invention to provide a joint of the constant velocity type and to so construct the members thereof as to inherently require a substantially perfect positioning of the balls at all times and hence, which will prohibit displacement of the balls from their correct respective positions either accidentally or otherwise both during periods of idleness and during periods of operation.

More specifically it is an object of this invention to provide two main members, the usual driving balls and guide means for cooperating with balls which, in one instance comprises a retainer and in another instance is a simple pilot means, and to so form and construct these members with the use of eccentricities of cooperating surfaces that any tendency to displace the balls from their proper respective positions will immediately encounter a wedging action, this wedging action being available at all times by the inherent construction of parts. In addition, the present joint is distinguished over prior art in that during non-rotative periods the two main parts may be freely swung to various relative angular positions without binding.

There is a choice in the selection of eccentricities so that for further explanation reference will now be had to the accompanying drawings, wherein my invention is illustrated by way of example in several modifications, all of which will be seen to include the principle of eccentricities but which will be seen to fail otherwise in mechanical equivalency as will now appear, and in which—

Figure 1:
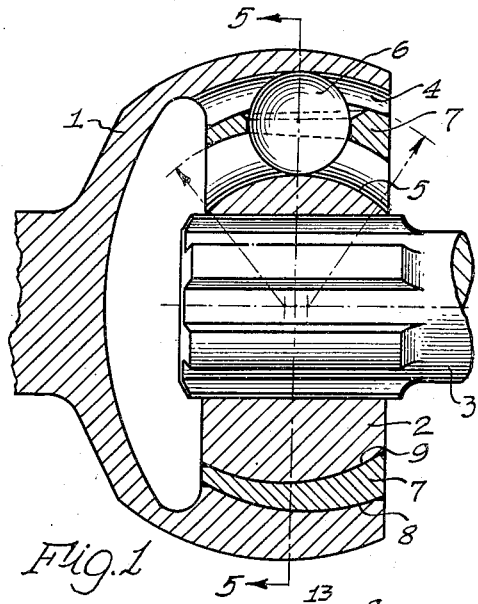
Figure 1 is a longitudinal section taken along the line 1—1 of Figure 2 and showing a universal joint incorporating my invention.
Figure 2:
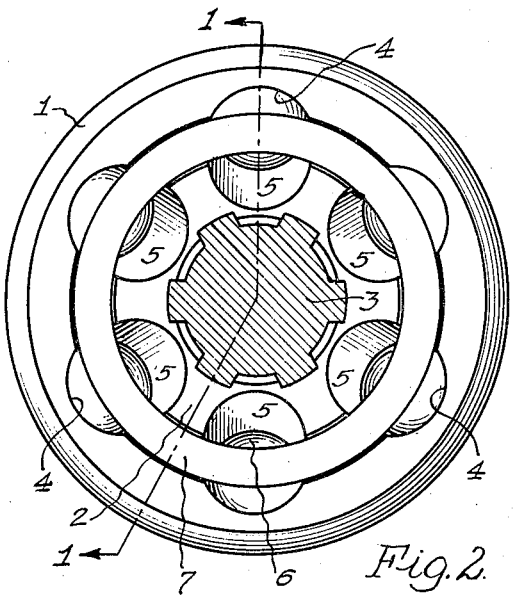
Fig. 2 is an end elevation of the right end of the joint shown in Figure 1.
Figure 3:
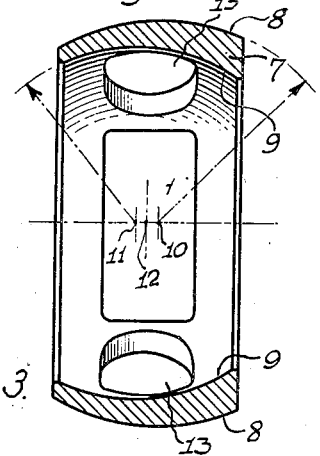
Fig. 3 is a longitudinal diametric section of the ball pilot means seen in Figures 1 and 2.
Figure 5:
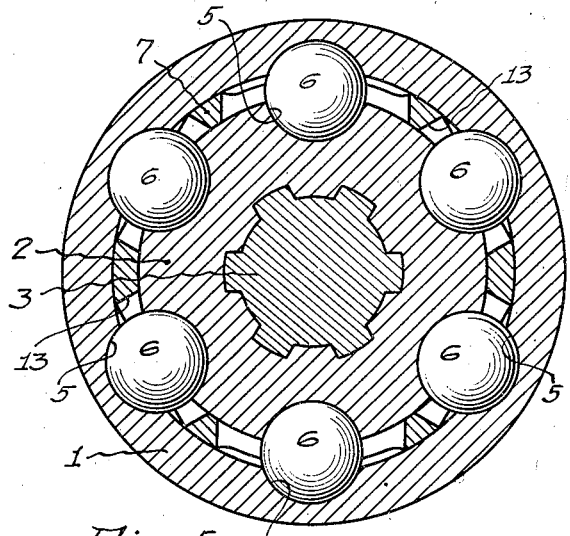
Fig. 5 is a transverse section taken along the line 5—5 of Figure 1, normal to the axis of the joint.
Figure 4:
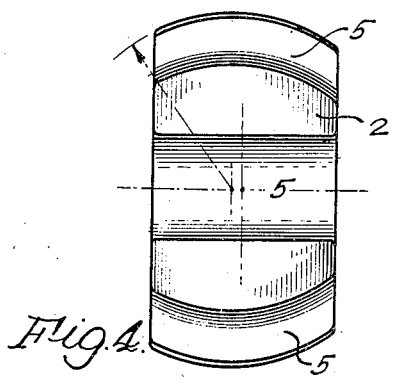
Fig. 4 is a side elevation of the inner main member seen in Figures 1 and 2.

More specifically, the numeral 1 indicates a main member of a universal joint, known as the bell member, which is generally of a spherical outer shape and which is hollow to receive a second main ball member 2. The member 2 is usually made to receive splines of a shaft 3. These main members are provided with corresponding grooves 4 and 5 for the reception of balls 6 through which driving is accomplished. A cage or pilot means 7 resides between and surface contacts with the outer and inner members 1 and 2. The ball retainer 7 has an inner surface 8 and an outer surface 9 both of which are spherical but from different centers 10 and 11. The preferred construction, as illustrated, is where the center 12 about which the balls 6 roll resides between and equidistant from the centers 10 and 11 when the axes of the members 1 and 2 coincide. The exact relative positions of the three centers will not be maintained when the members assume a relative angularity. It will thus be seen that the greatest diameter of the retainer will not lie in a plane normal to the axis of and bisecting the thickness of the retainer but will lie to one side of such a plane. The retainer is provided with openings 13 to receive the balls 6. The inner surface of the bell member 1 is spherical and has the same center as has the outer surface 8 of the retainer 7 when their axes coincide. The outer surface of the member 2 is spherical and has the same center as the inner surface of the retainer 9 when their axes are alined. The grooves in both members 1 and 2 which receive the balls 6 are longitudinally arcuate with the point 12 as their center. In other words a plane bisecting any groove longitudinally will describe an arc having the point 12 as its center.

Figure 6:
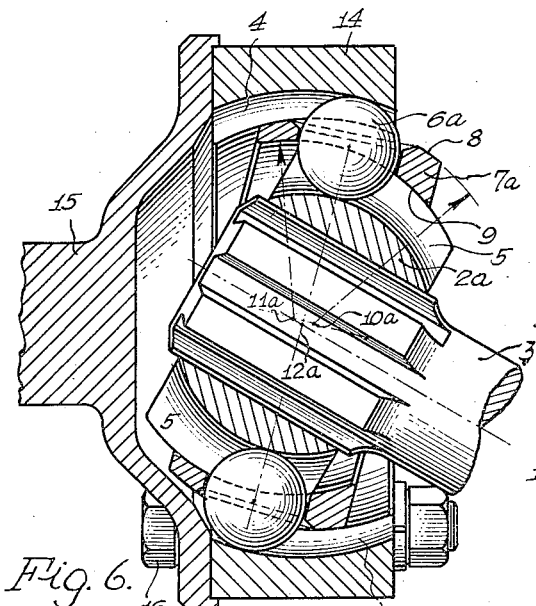
Fig. 6 is a section similar to Figure 1 showing my invention applied to a different type joint with the main members at an angle with respect to each other.
Figure 7:
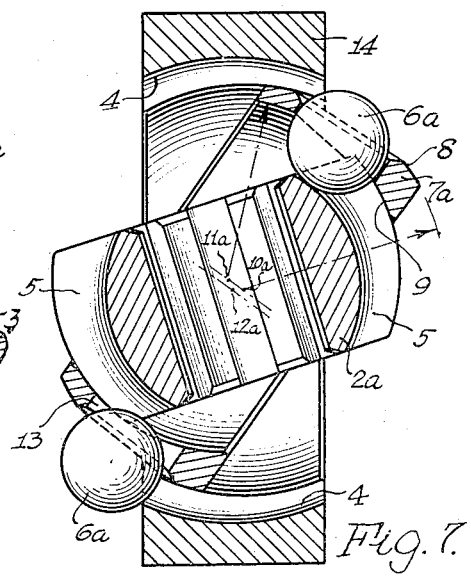
Fig. 7 is a diametric section showing the two ball races, the ball retaining means and the balls employed in the joint shown in Figure 6.
Figure 8:
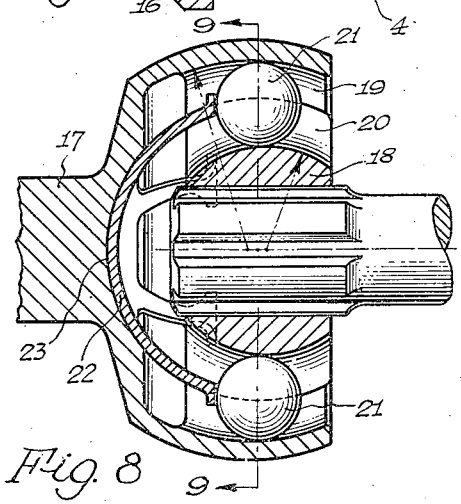
Fig. 8 is a diametric section showing my invention as applied to a different type joint.
Figure 9:
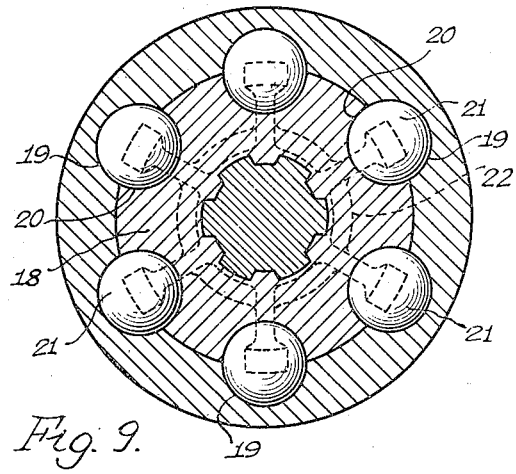
Fig. 9 is a diametric section taken along the line 9—9 of Figure 8.

The construction shown in Figures 6 and 7 is similar to that described above except that instead of an integral bell member, the main outer member consists of an outer race member 14 secured to a rotative member 15 by means of bolts 16 or other suitable means. The outer race 14, the inner member 2a, the retainer 7a and the balls 6a may all be assembled into a unit and then secured to the member 15, the assembling being accomplished as illustrated in Figure 7 by rotating the two inner members 2a and 7a about a diameter until openings 13a are exposed sufficiently to receive the balls, as is understood in the art.

In Figure 6 the three centers, previously mentioned, are indicated with the main members in angular position. Note that the centers 10a and 11a of the two retainer surfaces lie on a line above the center 12a and hence these centers have very slightly approached each other. This mathematical imperfection would prove ruinous were the centers varied too greatly from the relative positions shown. On the other hand, I have found that by proper proportioning this seeming imperfection may be converted into an asset to cause a slight tightening of the several parts when great angularity is encountered and hence when any play is conducive to breakage.

The essential difference between the two joints just described is most apparent in the manner of assembly, that shown in Figs. 6 and 7 requiring an assembly of the outer race, the retainer, balls and inner member before bolting to the member 15. The operation is essentially the same and is as follows: when the axes of the two main members coincide the two centers of the retainer also lie on the common axis. The outer surface of the retainer is in sliding contact with the inner surface of the larger main member and the inner surface of the retainer is in sliding contact with the outer surface of the smaller main member. If pressure is applied, say, to the top of the cage (Fig. 1) in an attempt to displace it and the balls, such pressure will not affect movement because of the diminishing distances between the two main members in the direction of such pressure. In other words in the section illustrated at the top of this figure there will be a wedging action and hence no movement. The same condition holds regardless of what point of the retainer receives such pressure and regardless of the direction of application. The balls, of course, cannot be displaced without movement of the retainer. Now, suppose that the main members are given relative angularity to some amount, as for instance, to a position shown in Figure 6. The cage 7a will inherently be displaced diametrically by an amount equal to substantially half the difference of the total relative diametric movement of the two main members. The outer surface of the retainer must rotate about the center 11a and the inner surface thereof must rotate about the center 10a whereas the main member 2a rotates about the center 12a. Note the lower section through the retainer in this Figure 6. The thick end has now entered between the two main members whereas a thinner portion is directly thereabove as seen in the upper section. This shows that the retainer has shifted diametrically so that the two centers reside on a line above the center 12a. The retainer is in surface contact with both main members and here again we have an eccentric or wedging action ready to resist any displacement of the balls from the exact position illustrated. Any relative angularity whether during periods of idleness or during rotation will require and encounter the same exactness of relative positioning of parts. Attention is also called to the fact that the points or area of contact of the retainer similarly shifts with respect to the balls so that the line of pressure through the balls will vary. The ball centers are indicated on the drawings to call attention to this.

Figure 10:
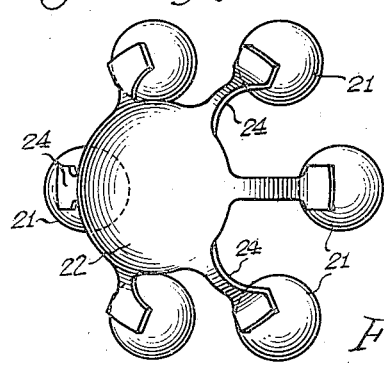
Fig. 10 is a perspective view of the ball pilot means and the balls, as shown in Figure 8.
Figure 11:
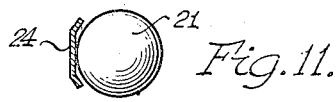
Fig. 11 is a detail showing the contact of one ball with the ball pilot.

In Figures 8, 9, 10 and 11 another type of joint is illustrated which is somewhat different from all the foregoing both in construction and in method of assembly, but which employs eccentricity according to the principles above described. This joint has a main member 17 made either as a bell member of the type shown in Figure 1 or as a two part member shown in Figure 6, having a main member 18 residing therein. These members have concentric opposed spherical surfaces which may or may not be in surface sliding contact with each, as desired. As shown they are in sliding contact and are provided with corresponding grooves 19 and 20 respectively to receive the driving balls 21. The grooves 19 and 20 are longitudinally arcuate, that is, a plane bisecting the grooves longitudinally will describe an arc, and the center of the arc of each groove in the outer member will be offset from the center of the arcs of the corresponding groove of the inner member, the center of the main members being preferably therebetween when the main members are alined. In this case the grooves themselves form the wedging surfaces which resist improper displacement of the balls. A ball pilot 22 is provided as best shown in Figure 10. This pilot may be constructed more or less as a spider with a spherical bearing portion for sliding contact with a spherical portion 23 in the member 17. This bearing portion has fingers 24 for contacting the balls 21. These fingers need not have circular contact with the balls but are preferably constructed as illustrated. The contact point is not constant because the grooves tend to converge toward each other in following the surface of the balls so that the fingers 24 are given a width as best shown in Fig. 11. In assembly, the pilot means 22 is insertable axially into the main member 17. The balls are insertable one at a time between the main members while giving them their maximum angularity during progressive rotation.

Modification may be made without departing from the spirit of my invention, and I therefore desire to be limited as to protection only as defined by the scope of the appended claims.

What I claim is:

1. In a universal joint, two main members having driving balls therebetween and a pilot means for said balls, said main members having main working surfaces having centers offset with respect to each other for cooperation with said balls to resist any tendency of said balls to become displaced from their proper, relative position with respect to said main members.

2. In a universal joint, two main members having driving balls therebetween and swingable about a common center, and a retainer or pilot means for said balls, said main members having main working surfaces having centers offset with respect to their common center constituting cams for cooperation with said balls and pilot means, the cams of one member having a different center from the cams of the other member, at least one of said balls upon tending to become displaced from its proper relative position with respect to said main members encountering a wedging action between said cams.

3. In a universal joint, two main members having driving balls therebetween and swingable about a common center, a retainer or pilot means embracing said balls, said main members having opposed surfaces described from centers offset with respect to each other for cooperation with said balls, said pilot means upon relative angular movement of said main parts shifting its relative embracing position with said balls under the influence of said offset surfaces and said balls.

4. In a universal joint, two main members having driving balls therebetween and swingable with respect to each other about a common point, the inner of said members having its outer surface constituting a portion of a sphere having its center offset from said common point, and a retainer for said balls having an inner spherical surface with the same center as the outer surface of said inner member when in co-axial position.

5. In a universal joint, two main members having driving balls therebetween and swingable with respect to each other about a common point, the outer of said members having an inner surface constituting a portion of a sphere having its center offset from said common point, and a retainer for said balls having an outer spherical surface with the same center as the inner surface of said outer member.

6. In a universal joint, two main members having driving balls therebetween and swingable with respect to each other about a common point at the center thereof, said inner member having an outer surface constituting a portion of a sphere having its center offset from said common point, said outer member having an inner surface constituting a portion of a sphere having a center offset from said common point, and a retainer for said balls having an inner spherical surface with the same center as the outer surface of said inner member and an outer spherical surface with the same center as the inner surface of said outer member.

7. In a universal joint, two main members having driving balls therebetween and swingable with respect to each other about a common point at the center thereof, said inner member having an outer surface constituting a portion of a sphere having its center offset from said common point, said outer member having an inner surface constituting a portion of a sphere having a center offset from said common point, and from the center of the spherical surface of said other member, and a retainer for said balls having an inner spherical surface with the same center as the outer surface of said inner member and an outer spherical surface with the same center as the inner surface of the outer member.

8. In a universal joint, two main members having driving balls therebetween and swingable with respect to each other about a common point at the center thereof, said inner member having an outer surface constituting a portion of a sphere having its center offset from said common point, said outer member having an inner surface constituting a portion of a sphere having a center offset from said common point by an amount substantially equal to the offset of the center of the spherical surface of said other member, the two offset centers each being on the axis of its corresponding main member when co-axial therewith and on opposite sides of the common center of swing through which said axes pass, and a retainer for said balls having an inner spherical surface with the same center as the outer surface of said inner member and an outer spherical surface with the same center as the inner surface of said outer member.

9. In combination in a constant velocity universal joint, two main members having driving balls therebetween, and a retainer for said balls of non-uniform thickness, said retainer shifting diametrically of itself upon angular movement of said main members with respect to each other.

10. In combination in a constant velocity universal joint, two main members having driving balls therebetween, a retainer for said balls of non-uniform thickness and opposed surfaces on said main members described from offset centers constituting means for shifting said cage diametrically upon angular movement of said main members with respect to each other.

11. In combination in a constant velocity universal joint, two main members having driving balls therebetween, a retainer for said balls of non-uniform thickness, means comprising opposed surfaces of said main members described from offset centers for causing said retainer and said balls to shift their regions of contact proportionate to the amount of travel of said balls upon angular movement of said main members with respect to each other.

12. In combination in a universal joint, two main members having corresponding grooves therein and driving balls residing in said grooves, all of the grooves of both of said main members being of progressively varying depth along their lengths.

13. In combination in a universal joint, two main members having corresponding grooves therein and driving balls residing in said grooves, said grooves each having an arcuate base eccentric with respect to said main members.

14. In combination in a universal joint, two main members having corresponding grooves therein and driving balls residing in said grooves, said grooves each having an arcuate base line described on the arc of a circle having its center offset with respect to said main members, each arcuate base line of the grooves in the outer of said main members having a different center from its corresponding groove in the inner of said main members.

15. In combination in a universal joint, two main members having corresponding grooves therein, driving balls in said grooves, and pilot means for said balls, said grooves each being arcuate in the direction of its length and having the center of the arc offset with respect to the center of said main members.

16. In combination in a universal joint, two main members having corresponding grooves therein, driving balls in said grooves, and cage retaining means for said balls, said cage having contacting surfaces of less than 180° with said balls, said grooves each being arcuate in the direction of its length and having the center of its arc offset with respect to the center of said main members.

BERNARD K. STUBER.